United States Patent [19]
Dunn et al.

[11] Patent Number: 5,701,491
[45] Date of Patent: Dec. 23, 1997

[54] METHOD AND SYSTEM FOR TRANSITIONING THE NETWORK MODE OF A WORKSTATION

[75] Inventors: John C. Dunn, Redmond; Forrest C. Foltz, Woodinville, both of Wash.

[73] Assignee: Microsoft Corporation, Inc., Redmond, Wash.

[21] Appl. No.: 455,536

[22] Filed: May 31, 1995

[51] Int. Cl.$^6$ .............................. G06F 9/44; G06F 9/445
[52] U.S. Cl. ............................................................ 395/712
[58] Field of Search ...................... 364/DIG. 1 MS File, 364/DIG. 2 MS File; 395/200.01, 200.02, 200.1, 700, 376, 651, 652, 653, 712

[56] References Cited

U.S. PATENT DOCUMENTS

| | | | |
|---|---|---|---|
| 5,142,680 | 8/1992 | Ottman et al. | 395/700 |
| 5,255,379 | 10/1993 | Melo | 395/400 |
| 5,355,490 | 10/1994 | Kou | 395/700 |
| 5,404,527 | 4/1995 | Irwin et al. | 395/700 |
| 5,577,210 | 11/1996 | Abdous et al. | 395/200.1 |

*Primary Examiner*—Robert B. Harrell
*Attorney, Agent, or Firm*—Leydig, Voit & Mayer

[57] ABSTRACT

A method and system for transitioning the operating mode and networking components of a network workstation from one mode of operation to another is described herein. In a disclosed embodiment, a method and system is described for transitioning a workstation from operating under a real mode operating system (with real mode network components) to operating under a protected mode operating system (with protected mode network components). A transition program preserves the state of the workstation before the real mode network components are loaded therein and enabled. The real mode network components are then enabled and utilized to transfer to the workstation memory the protected mode operating system and protected mode network components from the network. After the transfer, the transition program disables the real mode network components, restores the pre-real mode state of the workstation, and enables the protected mode network components. The memory allocated for the real mode network components may then be reclaimed.

11 Claims, 9 Drawing Sheets

METHOD AND SYSTEM FOR TRANSITIONING THE NETWORK MODE OF A WORKSTATION

FIELD OF THE INVENTION

The present invention relates generally to networks of computer workstations, and more particularly to a method and system for transitioning the operating mode and networking components of a workstation from one mode of operation to another.

BACKGROUND OF THE INVENTION

Certain types of microprocessors including the Intel® 386 class of microprocessors (386, 486, Pentium™ or the like) are designed to perform in distinct operational modes, including a sixteen-bit real mode of operation and a thirty-two-bit protected mode of operation. Operating in the protected mode generally enhances the level of performance of the microprocessor, such as by increasing the amount of memory the microprocessor is capable of directly addressing, and by increasing the speed of data transfers. In addition, when operating in the protected mode, the microprocessor hardware carries out validation checks including checks on memory references, function calls and I/O port accesses. Operating systems that take advantage of the protected mode capabilities of the 386 class of microprocessors include Microsoft® Corporation's Windows™ version 3.1, Microsoft® Windows™ for Workgroups (WfW) 3.11, and the Microsoft® Windows™ 95 operating system.

Alternatively, operating in the real mode enables the 386 class of microprocessors to be backward-compatible with operating systems, such as the widely used Microsoft® MS-DOS®, written for the sixteen-bit Intel® 8086 microprocessors. Despite the widespread popularity of such real mode systems, their capabilities are generally limited relative to protected mode operating systems and, as a result, do not take full advantage of the capabilities of the 386 class of microprocessors. Moreover, when used as a workstation on a network, the real mode operation further limits network performance, as Windows™ 3.1, WfW 3.11 and Windows™ 95 are all capable of utilizing 32-bit protected mode network components (e.g., transports, redirectors, media access protocols) that significantly improve network communication performance. It is therefore generally preferable to run protected mode operating systems and network components wherever possible.

However, protected mode operating systems and components are typically larger and occupy more memory and disk space than real-mode operating systems and components. As a result, each client on a network that desired to operate and communicate with the network in protected mode would typically be required to have and maintain the large protected mode operating system and network components in a large local storage device, such as a hard disk drive. An obvious problem with such an arrangement is the cost associated with supplying such storage devices to all clients on the network. In addition, the protected mode operating system and components must be individually loaded onto the individual client machines, thereby adding to the cost and maintenance demands related to updates of the software. There may also be security reasons for not allowing individual client machines to have large peripheral storage devices.

For these and other reasons, it may be desirable to have clients communicate with the network using an operating system and network components which do not require a large peripheral storage device. For competing reasons, once a connection is made to the network, it may be desirable to have clients communicate with the network using larger and more sophisticated operating system and network components.

OBJECTS AND SUMMARY OF THE INVENTION

Accordingly, it is an object of the present invention to provide a method and system for operating a network workstation under a protected mode operating system with relatively little or no local non-volatile storage capacity.

In accomplishing that object, it is another object to provide a method and system as characterized above wherein the workstation transitions from a real mode operating system to a protected mode operating system.

It is a related object to provide a method and system of the above kind wherein the workstation transitions from utilizing real mode network components to utilizing protected mode network components.

Another object is to reclaim resources including the memory allocated to the real mode operating system and components.

It is another object to enable workstations to operate as described above without requiring changes to existing workstation hardware.

Still another object is to provide a method and system of the above kind that is compatible with currently existing networks.

It is yet another object to restore the state of the workstation after transition to its original state.

Briefly, the invention provides a method and system for transitioning a client in a computer network system from a real mode network net to a protected mode network net. The transition is accomplished by first loading the real mode operating system onto the client workstation and then saving the state of the client workstation. Thereafter, the real mode network net is enabled and the client workstation connects to the network server for communication therewith using the real mode network net.

The client then obtains the core files from the network server associated with the protected mode operating system and protected mode net. The real mode network net is then disabled and the protected mode operating system and protected mode net are loaded into the memory of the client workstation and enabled. The state of the client workstation is also restored to its original state. Thereafter, the client workstation may use the protected mode net to obtain further files or otherwise communicate with the network.

An advantage to the above inventive scheme is to eliminate the need for client workstations to have and maintain locally the large protected mode operating system and network components, thereby freeing up peripheral storage devices of the client workstations or eliminating the need for them altogether.

Other objects and advantages will become apparent from the following detailed description when taken in conjunction with attached drawings, in which:

Figure 1:
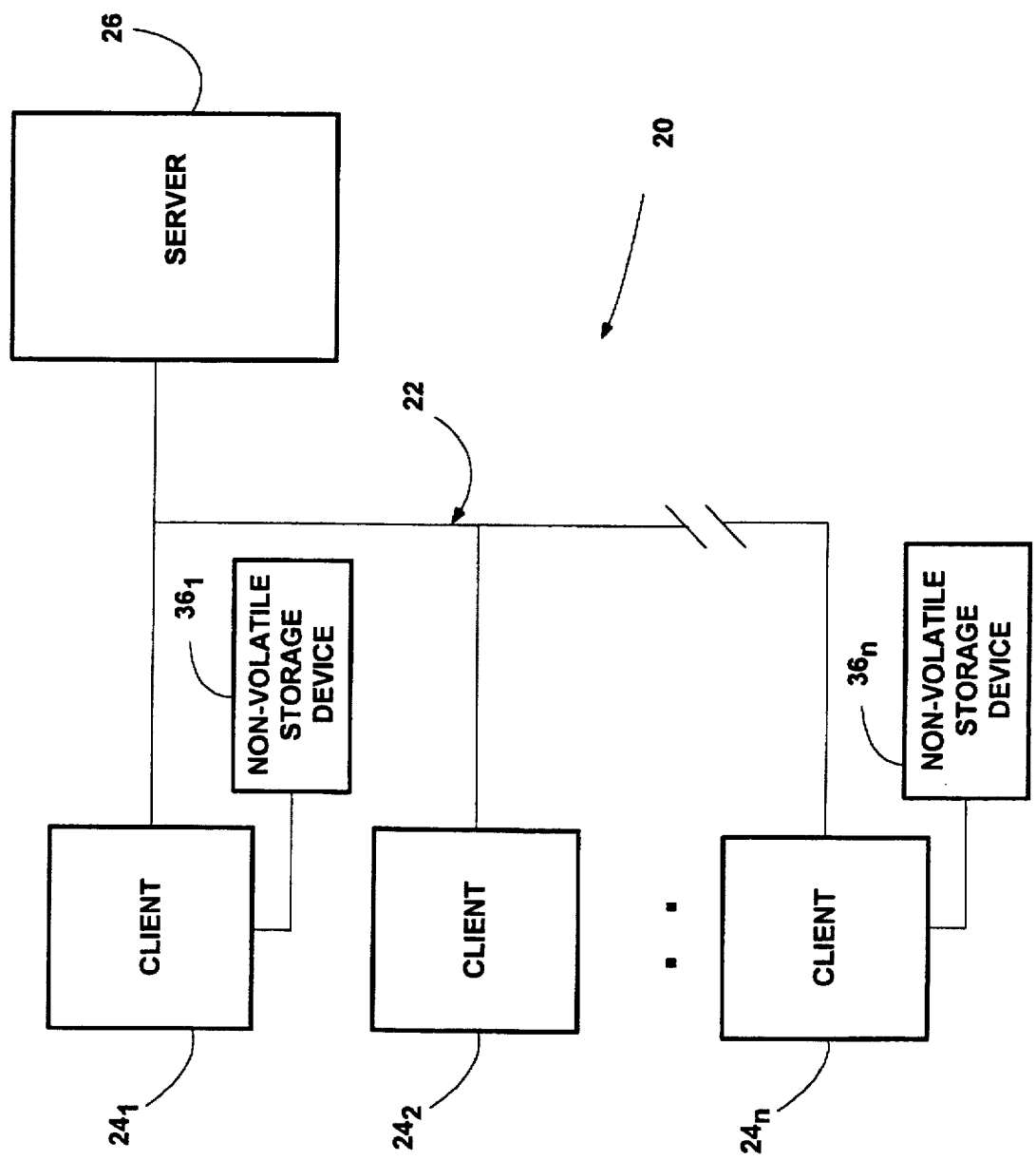
FIG. 1 is a block diagram of a computer network having a network server connected for communication with multiple client workstations and suitable for use with the invention.

While the invention is amenable to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Turning to the drawings and referring first to FIG. 1, there is shown a block diagram of a computer network, generally designated 20, which may use the transition method and system of the present invention. The network 20 comprises a number of computer-based devices interconnected on a communications link 22 in a conventional networked manner. The communications link 22 may comprise any well known data transmission medium, for example, fiber optic cable, 75 ohm coaxial cable and the like, in accordance with a chosen standard for hardware interfaces within each of the devices. Such standards, including ARCnet®, Ethernet® and Token Ring®, and their associated hardware interfaces are well known in the art, and thus are not described in detail herein.

In general, a number of client workstations $24_1-24_n$, which may be personal computers or the like, are connected via the communication link 22 to other nodes on the network, including a network server 26. Other devices, such as printers, routers or additional servers may be present on the network 20, but are not shown herein for purposes of simplicity. Although FIG. 1 shows a single network 20 configured in a bus network topology, the present invention may be implemented in a multiple bus network topology, for example where the network server 26 links multiple networks together. Moreover, the present invention may be implemented on other types of networking topologies including bus, ring or star topologies.

Figure 2:
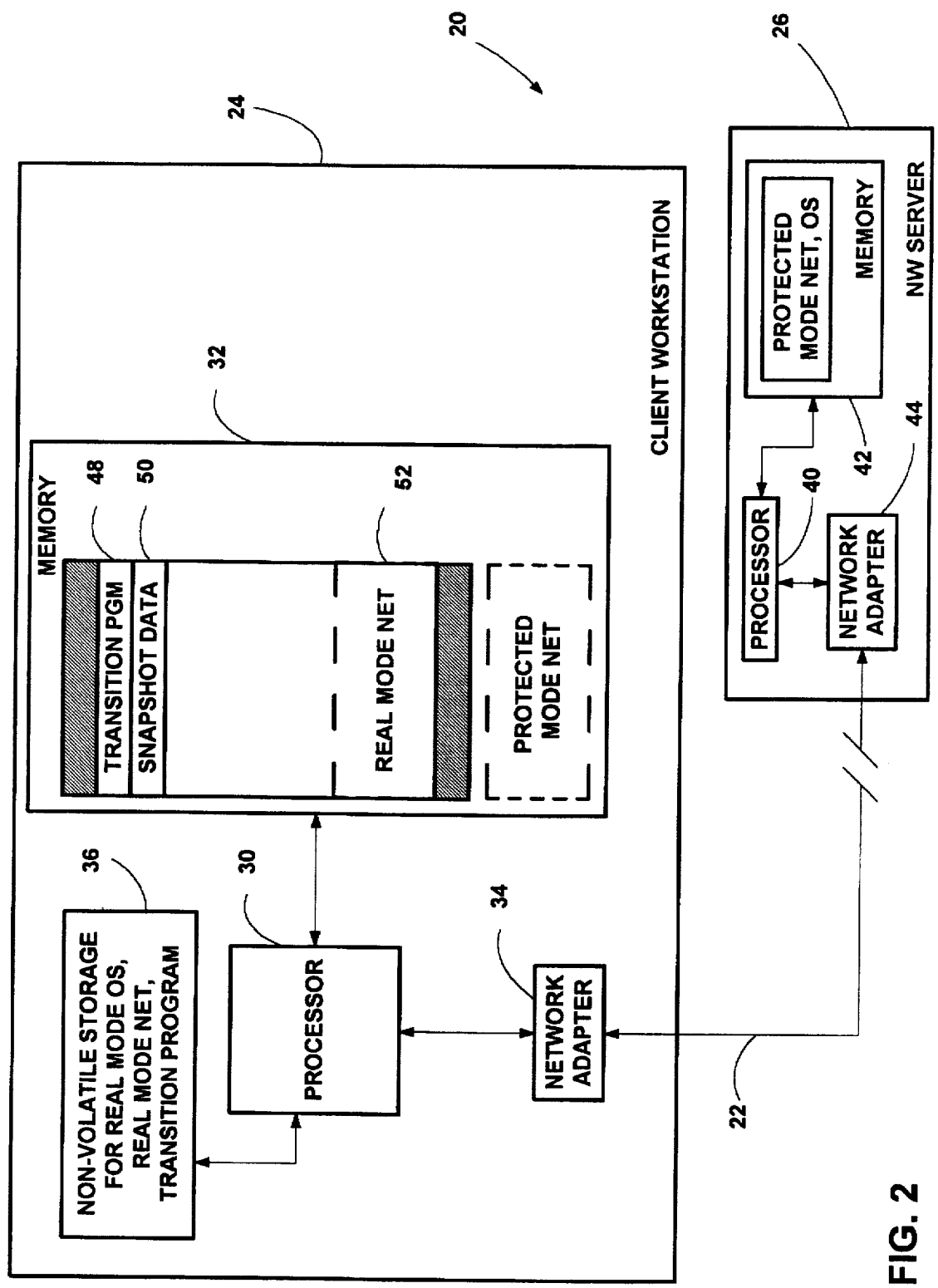
FIG. 2 is a block diagram illustrating components in a network server and a workstation for transferring the protected mode network drivers and operating system to the workstation.

In keeping with the invention, as shown in FIG. 2 each workstation 24 contains a workstation processor 30 capable of operating in both the real mode and the protected mode of operation, such as an Intel® 386 class of microprocessor.

The processor 30 is connected in a conventional manner to a memory 32 and input-output means including a network adapter 34 for interfacing the workstation 24 to the communications link 22. Alternatively, other communication devices such as a modem or the like may be used to connect the workstation to the network 20.

The network adapter 34 interface includes a Server Message Block (SMB) protocol redirector or Netware Core Protocol (NCP) redirector. In either case, the redirector may use a Microsoft® NDIS2 (network driver interface specification) driver for its network interface card (NIC) during the real mode portion of the process (described below).

According to one aspect of the invention, the workstation 24 includes means for loading the real mode operating system into the workstation memory 32. Such means may include a non-volatile storage device 36 such as a 1.2 megabyte or 1.4 megabyte floppy disk and drive combination or a hard disk drive. Alternatively, the means for loading the real mode operating system may include the necessary ROM and other hardware to accomplish remote program load (RPL) booting from the network server 26. With either configuration, it can be readily appreciated that the workstation memory 32 provides sufficient storage space for loading the real mode operating system, various real mode network components, (i.e., the real mode net), and other data, including at least part of the protected mode operating system, in the manner described below. Consequently, the memory 32 generally requires at least two megabytes of RAM, although additional megabytes may be desirable depending on the tasks to be performed by the workstation. In the preferred embodiment, MS-DOS® is the real mode operating system while Windows™ 95 is the protected mode operating system.

The network server 26 is typically PC-based and includes appropriate hardware and software for acting as a conventional server. As best shown in PIG. 2, the hardware includes a processor 40 operatively connected to a server memory 42, which includes both conventional RAM and a non-volatile storage means such as a hard disk drive (not shown). The server processor 40 is also operatively connected to a server network adapter 44, which may be any suitable input/output device in combination with any corresponding software and/or independent processing means for transmitting and receiving communications to and from the communications link 22. As is well known, conventional network adapters 44 are located on a network card or the like plugged into a personal computer, or on the motherboard itself, and may be arranged to directly access the memory 42 (DMA), use direct memory mapping, shared memory techniques or programmed input/output to communicate with devices on the network 20. A preferred server configuration may be implemented with a protected mode Intel 386 class of microprocessor, using the Windows™95 or Windows NT™ operating system employing a Microsoft® NDIS 3.1 Media Access Control (MAC) driver.

According to another aspect of the invention, the network server 26 stores the protected mode operating system, the protected mode network components (the protected mode net), and various protected mode initialization files on its hard disk. As described in more detail below, the server 26 also stores specific information about the workstations $24_1-24_n$ connected thereto, including the system data needed for booting the workstation.

Figure 6:
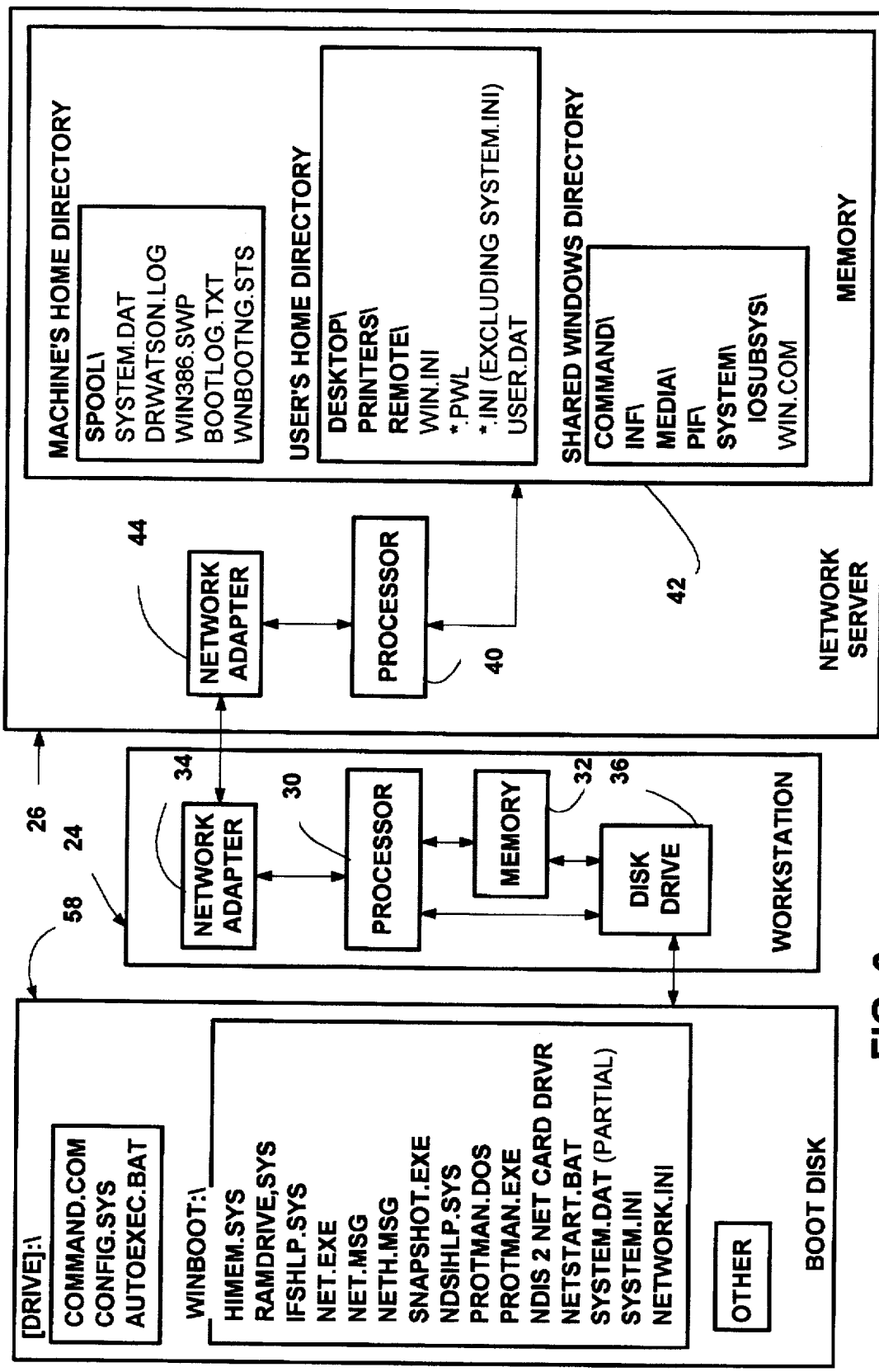
FIG. 6 is a block diagram illustrating an arrangement of files and directories on the boot disk and server storage device that is suitable for use with the present invention.

To set up the server 26, the protected mode operating system (Windows™ 95) and network communication interface (net) are be copied to the server memory 42, and user and machine directories created as necessary. As shown in FIG. 6, the server memory 42 stores machine-specific files in the machine directory, user-specific files in the user directory, and the Windows™ 95 files in a shared directory available to all appropriate clients.

To boot the workstation 24 from a boot disk on a hard or floppy drive, a boot disk 58 having appropriate files thereon is created. FIG. 6 illustrates one manner of arranging the directories and files among the boot disk directories and server directories that has been found suitable for use with the present invention. For RPL booting, the boot disk may be an RPL disk image on the server.

In the configuration of FIG. 6, the real mode network settings normally stored in system.ini are instead stored in the file named network.ini on the boot disk. Also on the boot disk, the machine's system data (stored in system.dat) which is used by winboot.sys, preferably contains only the information needed to initially boot the system and the information needed by the real mode network software. This is because the full system.dat file is unnecessary and may be too large for storing on the boot disk. Once the real mode network connection is made as described below, the full system.dat file may be loaded from the server 26, as needed.

Figure 4A:
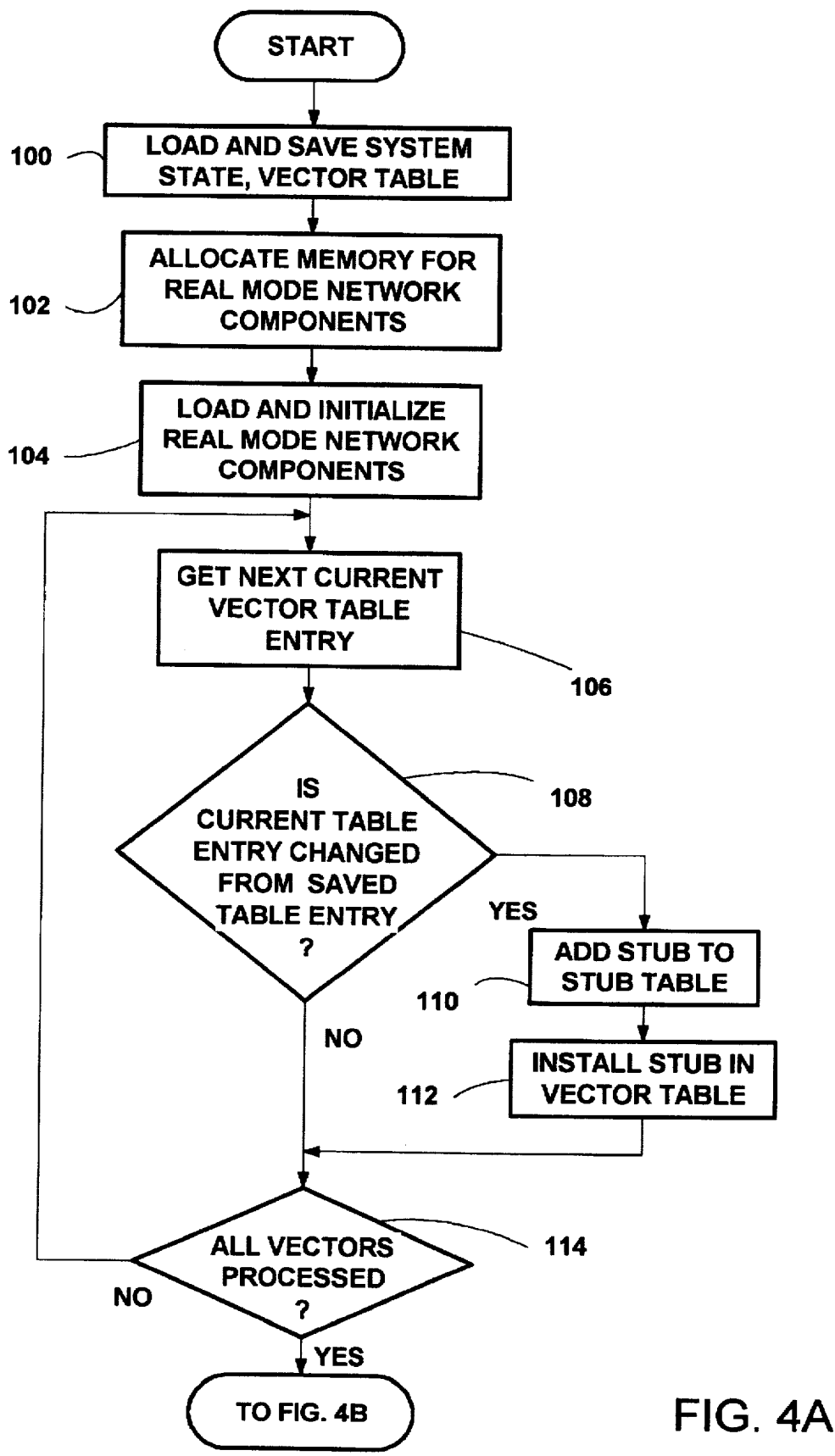
FIGS. 4A and 4B comprise a flow diagram illustrating the general steps taken by a transition program to transition a workstation from operating in the real mode with real mode network components to operate in the protected mode with protected mode network components.
Figure 4B:
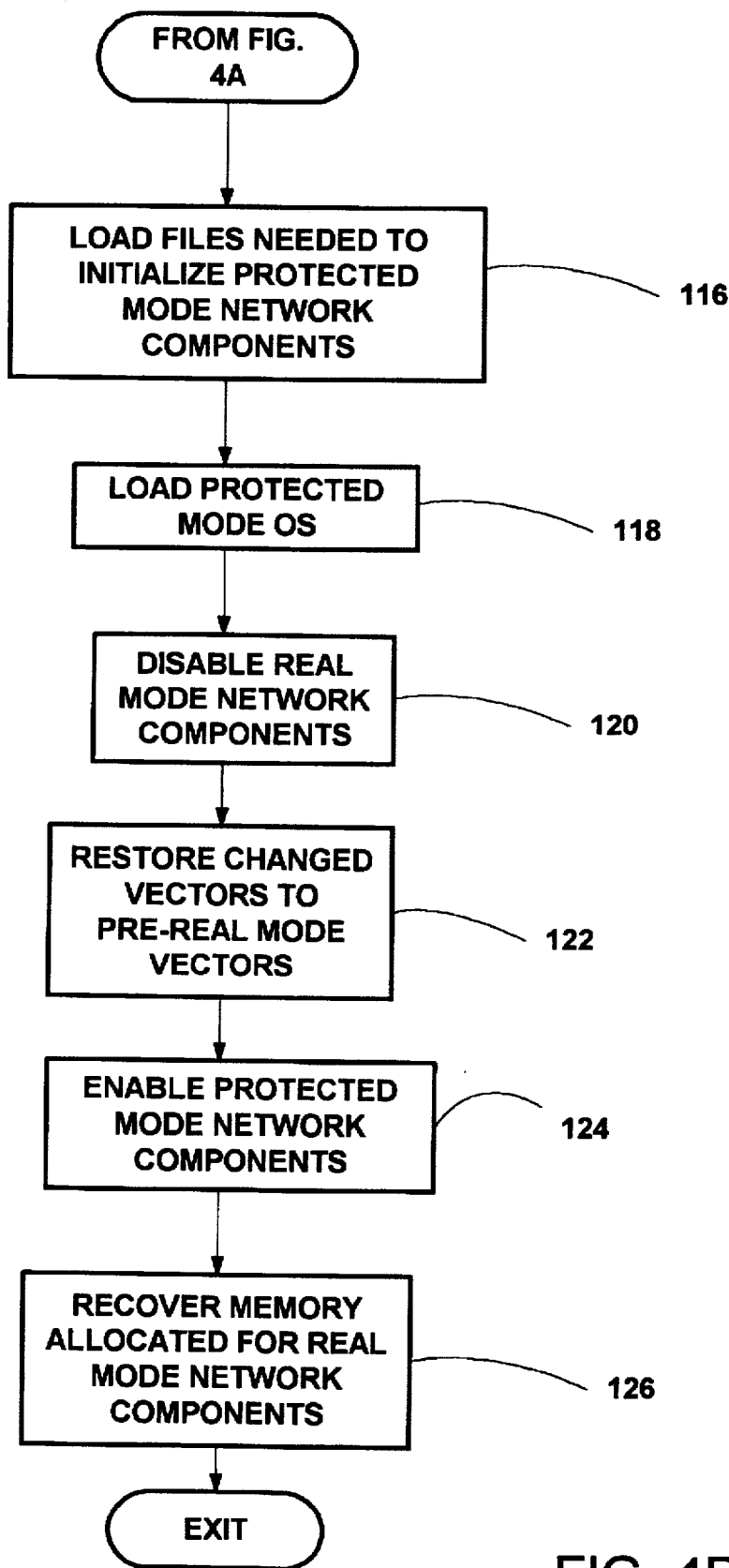

Turning to an explanation of the operation of the invention with particular reference to the flow diagram of FIG. 4, the workstation 24 is initially booted to operate in the 16-bit real mode, which includes loading the MS-DOS® operating system into a low section of the memory 32. This is ordinarily accomplished in a known manner as winboot.sys boots and reads the registry thereby determining that the machine is intended to operate as a client workstation running over the network 20. Winboot.sys then runs command.com to execute autoexec.bat and netstart.bat to start the network connection. Of course, the workstation 24 may function for a period of time as a local personal computer, whereby the netstart.bat is subsequently run in a conventional manner (e.g., by entering via a command line).

According to one aspect of the invention, a method and system are provided to enhance the performance of the workstation 24 by transitioning to a protected mode operating system which utilizes the protected mode net. Thus, rather than connecting to the network server 26 in a conventional manner, the batch file netstart.bat first executes a transitioning program, snapshot.exe, provided on the boot disk 58 of the workstation 24. When executed, the transitioning program preserves the state of the machine, and handles the transitioning to a protected mode of operation, including the restoration of the state of the machine. The transitioning program is a real mode TSR program that is loaded in a low section 48 of the workstation memory 32 (FIGS. 3A–3D) and remains there throughout the operation of the workstation 24.

Figure 3B:
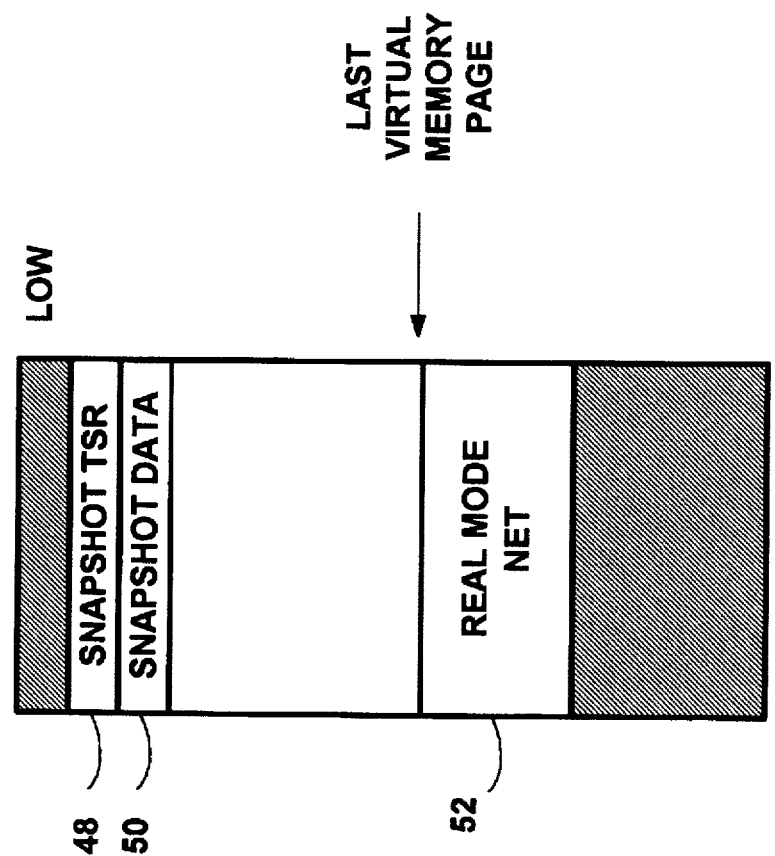
FIGS. 3A, 3B, 3C, and 3D are a series of block diagrams illustrating a portion of the workstation memory contents as the workstation transitions from real mode to protected mode.
Figure 3A:
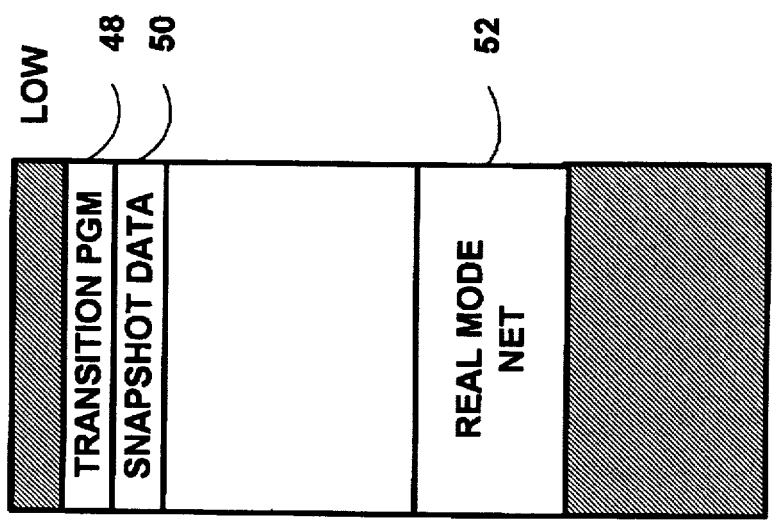
Figure 3D:
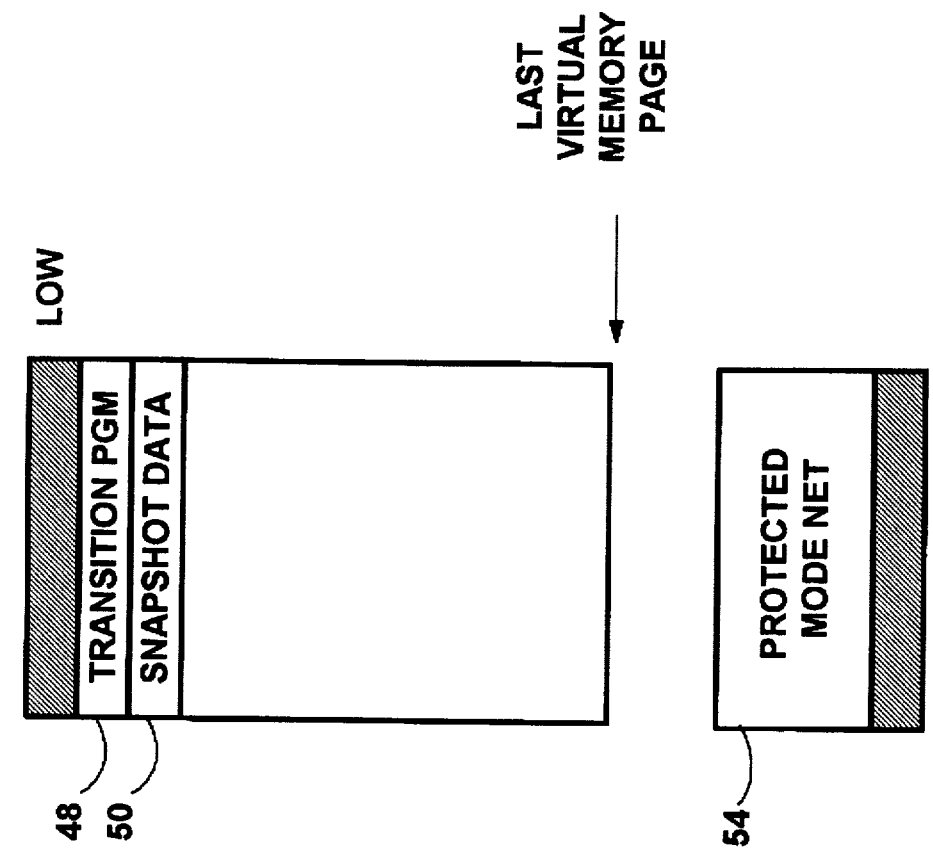
Figure 3C:
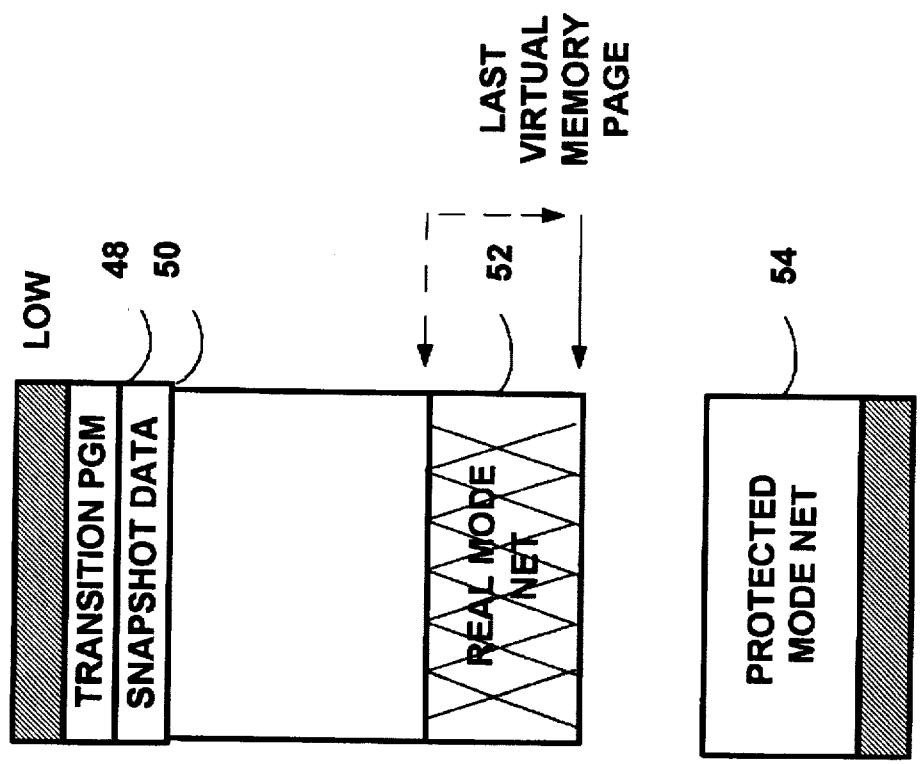

Once the transition program begins to execute, as shown in step 100 of the flowchart of FIG. 4A, an initial function of the transition program is to preserve in memory the system state, including the interrupt vector table, that exists before the real mode network starts. In other words, this portion of the transition program effectively takes a "snapshot" of the pre-real mode network interrupt vector table and stores the information as part of the snapshot data 50 of the workstation memory 32 (shown in FIGS. 3A–3D). As described in more detail below, the snapshot data 50 enables the workstation 24 to restore the system state after the protected mode operating system and the protected mode net are transferred from the network server 26 and initialized.

To connect the workstation to the network, at step 102 the transition program allocates a section of memory 52 (FIG. 3A) for loading the real mode net, ordinarily by calling an appropriate MS-DOS software interrupt function. The allocated section 52 of memory comprises a single memory control block at the highest location in conventional memory, to ensure that the real mode components may be easily removed when desired, as described in more detail below.

At step 104 the real mode network components are loaded into the allocated section 52 of memory 32 via suitable loader programs and initialized using information stored on the boot disk. The real mode network components loaded and initialized include a redirector, one or more transports, and an NDIS 2.0 media access control (MAC) driver. At this time, the real mode net is enabled.

Figure 5B:
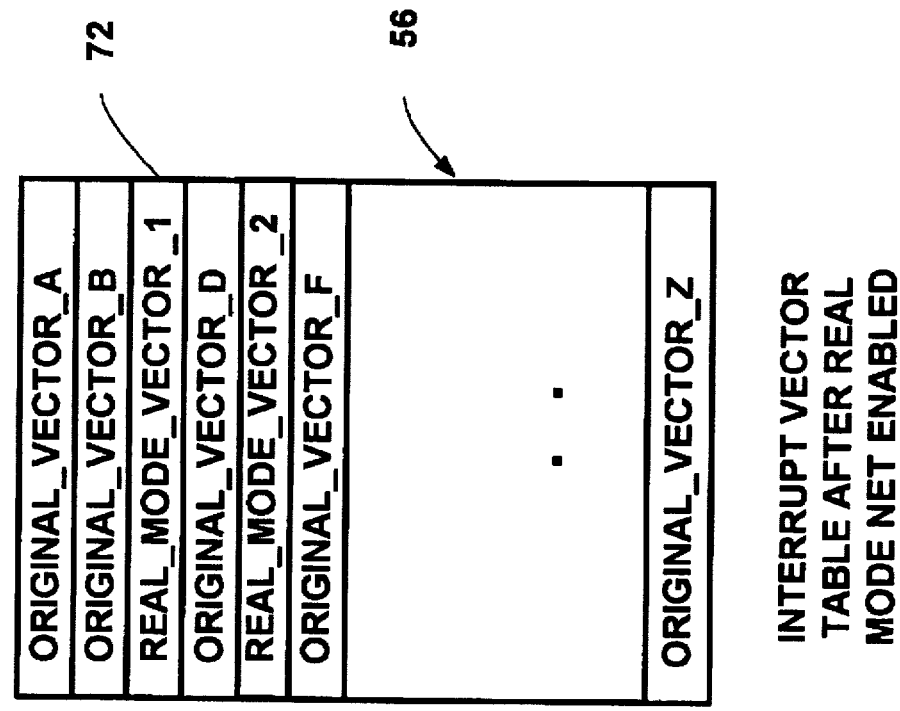
FIGS. 5A, 5B, and 5C are block diagrams illustrating the interrupt vector table A) after the real mode boot, B) after the real mode net is enabled, and C) after processing by the transition program, respectively.
Figure 5A:
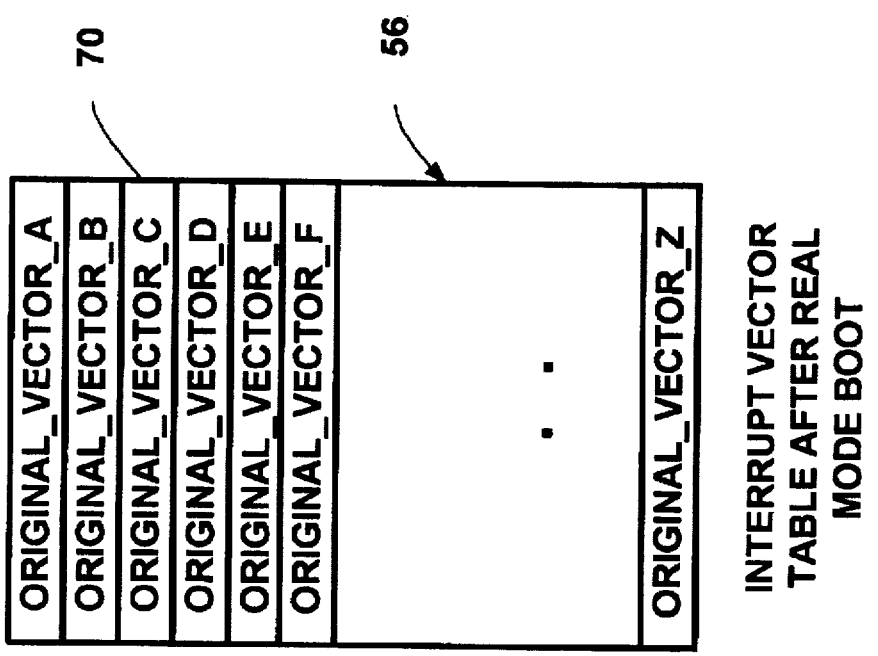

As shown in FIGS. 5A–5B, the act of enabling the real mode net changes the addresses of certain interrupt service routines stored in the interrupt vector table so that certain function calls are serviced by a real mode net routine rather than by existing software interrupt routines or TSRs. In other words, during the installation of the real mode net, some of the vector entries in the interrupt vector table are hooked and replaced by the real mode net hooks. As described in more detail below, the real mode net hooks will be removed in order to enable the protected mode network components and subsequently reclaim the memory occupied by the real mode net. Accordingly, the present invention provides a mechanism to use the real mode net hooks when needed, and then effectively remove them from the interrupt vector table and replace them with the original vectors when the real mode net is no longer needed.

To this end, after the real mode net has been installed and initialized (step 104), at steps 106–108 the transition program reads and compares on a vector-by-vector basis each entry in the old pre-real mode net installation vector table 56 (FIG. 5A) preserved at step 100 in snapshot data 50, against each entry in the new, post-real mode net installation vector table 56 (FIG. 5B). If a change is identified, the transition program saves the old interrupt vector (OLD__ISR) and new interrupt vector (NEW__ISR) in a stub table that it maintains (step 110), and substitutes a transition address (or stub) for the NEW__ISR in the interrupt vector table 56 (FIG. 5C), at step 112. In this manner, the transition address is used as an index to the stub table containing the OLD__ISR and NEW__ISR. Steps 108–114 loop until it is determined at step 114 that all of the vectors in the interrupt vector table have been processed in this manner.

The stub entries enable the transition program to maintain control of calls to the interrupt vector table rather than allowing the call to be directly vectored to the real mode net processes. The transition program, which maintains a flag indicative of whether the real mode net needs to be operational, utilizes the stub table to chain any received calls to the NEW__ISR or the OLD__ISR depending on whether the real mode net is needed. Thus, when the real mode net is initially needed for network communications, and a vector corresponding to one of the stubs is called, the stub routine directly chains to the corresponding real mode vector (NEW__ISR) preserved in the stub table. In this manner, the real mode net functions as before, but under the control of the transition program.

Figures 5C, 5D:
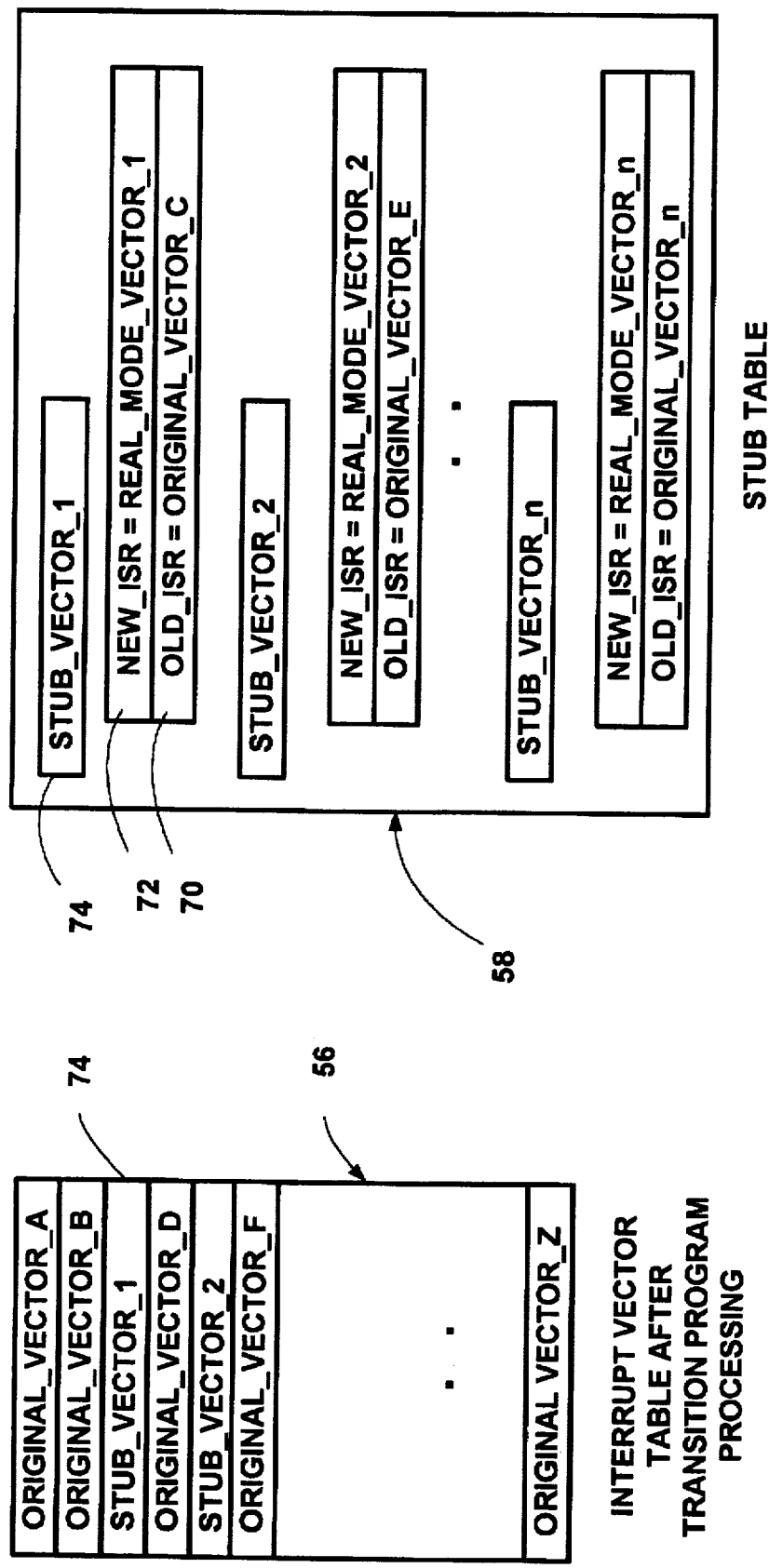
FIG. 5D is a block diagram illustrating a stub table created by the transition program to control the operation of the interrupt vector table.

By way of example, if ORIGINAL__VECTOR__C 70 (FIG. 5A) is in the interrupt vector table 56 before the real mode net is enabled, and REAL__MODE__VECTOR__1 72 hooks ORIGINAL__VECTOR__C 70 when the real mode is enabled, then REAL_MODE_VECTOR_1 72 replaces ORIGINAL_VECTOR_C 70 in the interrupt vector table 56 (FIG. 5B). Thereafter, the transition program, recognizing this change by preforming the above-described snapshot comparison at steps 106–114, substitutes STUB_VECTOR_1 74 for REAL_MODE_VECTOR_1 72 in the interrupt vector table 56 (FIG. 5C). The transition program further preserves the REAL_MODE_VECTOR_1 72 as the NEW_ISR and the ORIGINAL_VECTOR_C 70 as the OLD_ISR at the entry in the stub table 58 (FIG. 5D) for STUB_VECTOR_1 74. It can be readily appreciated that the above-described example functions similarly regardless of whether the ORIGINAL_VECTOR_C 70 is the vector that was initially present immediately after the boot-up or the address of another TSR that hooked that initial vector.

To make the connection to the network server 26, the real mode net uses the user's credentials (user name and password) in the conventional manner as if the system was configured to login users using the real mode net. Alternatively, if the network is configured to login users using the protected mode net, a generic user name will be temporarily utilized, with a user-specific login occurring only after the protected mode net is in operation as described below. With either configuration, a valid connection is made to the network server 26 using the real mode net.

To begin the transition from the real mode to the protected mode, the transition program executing at the workstation 24 transmits a request to the server 26 (over the real mode net connection) to begin transferring protected mode files thereto. At step 116, the files are received and loaded into a high section 54 of workstation memory 32 reserved for the protected mode net (shown in FIGS. 3B and 3C). Preferably, these files include only the core protected mode operating system components and the files required to initialize the protected mode net. The remainder of the protected mode operating system and net files can be retrieved later, as needed, using the protected mode net once it is installed. Alternatively, the real mode net may be used to transfer any additional protected mode files beyond the core files, at the option of the system administrator, provided the workstation memory 32 has sufficient capacity.

At the completion of step 116, a sufficient amount of the protected mode operating system and net has been transferred to operate the workstation 24 with protected mode network components. Accordingly, at step 118, the protected mode operating system is loaded and enabled. However, before the protected mode net can be enabled, the real mode net is disabled. In this manner, problems associated with running multiple nets are avoided. For example, if the real mode net is not disabled, certain function calls made by application programs may be erroneously chained to the incorrect interrupt vector, thereby creating the possibility of a system failure.

To disable the real mode net, at steps 120 and 122 the transition program effectively restores the original vector table entries by exclusively utilizing the OLD_ISR addresses in lieu of the NEW_ISR addresses whenever the stub routine is called. This effectively removes the real mode net hooks thereby disabling the real mode net. Any protected mode net hooks will hook the stubs, which, if called, will chain to the OLD_ISRs as if the real mode net had never been installed. This has the effect of restoring the changed interrupt vector table back to its pre-real mode net state. Alternatively, the OLD_ISRs could be directly restored to the interrupt vector table 56 for the transition addresses; however, if the transition addresses themselves were hooked, system integrity problems may arise.

Another function of the transition program is to obtain system state information from the real mode net, including the user name and drive mappings. The transition program obtains this information from the real mode redirector by making a series of API calls to interrupt 2fh. The transition program stores this information as part of the snapshot data 50 and manages passing the information, including at least one server connection, to the protected mode redirector through another series of API calls to interrupt 2fh.

At step 124, the protected mode net is now ready to be enabled. This is accomplished as the transition program signals the NDIS protected mode virtual driver to enable the protected mode network components previously loaded at step 116. The network components are then initialized using the initialization files (transferred at step 116), and the connections, user name and drive mappings obtained from the real mode net. As discussed above, if a generic real mode login occurred, the user name will be generic, and accordingly, a user-specific protected mode login will be initiated and accomplished in a conventional manner after the protected mode net is enabled.

In order for the protected mode net to function, the execution of the protected mode net similarly hooks the necessary vectors in the interrupt vector table 56, which includes the stubs set to chain to the original vectors. The protected mode net thus becomes operational, and, is ordinarily first used to load any untransferred portion of the protected mode operating system to the workstation 24. Preferably, the protected mode operating system attempts to transition to an NDIS3 NIC driver, provided one is available and compatible with the workstation adapter 34. Otherwise the protected mode operating system will continue to use the existing NIC driver (e.g., NDIS2). Regardless, at this time the workstation is fully operational as a protected mode device utilizing the 32-bit protected mode network components.

Although not necessary to the invention, after the protected mode operating system and drivers are fully operational, the memory allocated for the now-disabled real mode net is freed in order to maximize the resources of the workstation 24. To simplify the memory reclamation, at step 104, the real mode network components were loaded into a memory control block (MCB) 52 allocated by the transition program high in conventional memory (step 102). Freeing of this memory is accomplished through an API function call to the protected mode's virtual machine manager (VMM) informing the VMM that this space is now available for allocation to programs and the like. For example, the transition program may pass the address of the MCB to Windows™ 95 through the Windows int 2f startup broadcast. When the address is passed, the VMM adjusts the pointer it uses to indicate the location of the last virtual memory page as shown in FIGS. 3C–3D.

As can be seen from the foregoing detailed description, there is provided a method and system for operating a network workstation under a protected mode operating system with relatively little or no local non-volatile storage capacity. The workstation transitions from a real mode operating system to a protected mode operating system, and transitions from utilizing real mode network components to utilizing protected mode network components. Moreover, without requiring changes to existing workstation hardware, the state of the workstation after the transition is restored, and the resources including the memory allocated to the real mode operating system and components are reclaimed. Finally, the method and system is compatible with currently existing networks and network devices.

What is claimed is:

1. In a computer network system having at least one client workstation connected to a network server, a method of transitioning a client from a first network net operating in a first mode to a second network net operating In a second mode different from the first mode, comprising the steps of:

loading a first operating system into a memory of the client workstation;

saving the state of the client workstation and thereafter enabling the first network net;

connecting the client workstation to the network server for communication therewith using the first network net;

transmitting by the client workstation using the first network net a request to the network server for files associated with a second operating system and second network net;

receiving at the client workstation using the first network net files associated with the second operating system and second network net and loading the second operating system and second net into the memory of the client workstation when the first operating system and first network net remain in said memory;

restoring the state of the client workstation and disabling the first network net; and enabling the second network net.

2. The method of claim 1 wherein the step of saving the state of the client workstation includes the step of preserving an interrupt vector table, before the first net is enabled and creates a modified vector table.

3. The method of claim 2 wherein the step of saving the state of the client workstation further comprises the following steps:

comparing a vector entry in the preserved interrupt vector table with the corresponding vector entry in the modified vector table; and saving the corresponding vector entries in memory and replacing the vector entry in the modified vector table with a transition address which indexes the saved entries when the corresponding vector entries do not match.

4. The method of claim 3 wherein the step of comparing a vector entry in the interrupt vector table with the corresponding vector entry in the modified vector table is sequentially repeated for all vector entries therein.

5. The method of claim 2 wherein the step of restoring the system state includes the step of disabling the first net before the second net is enabled.

6. The method of claim 5 wherein the step of disabling the first net includes the step of chaining function calls, which attempt to call the first net using the modified interrupt vector table, to the original vector entry contained in the preserved interrupt vector table.

7. The method of claim 1 further comprising the step of freeing the memory allocated to the first net.

8. The method of claim 1 wherein the first operating system is a real mode operating system and the first network net comprises real mode components, and wherein the second operating system is a protected mode operating system and the second network net comprises protected mode components.

9. The method of claim 1 further comprising the step of transferring additional files associated with the second operating system using the second net.

10. A client workstation usable in a network environment which is communicative with at least one network server via a network communications link, the client workstation comprising:

a network adapter configurable to connect the client workstation to the network server for communication therewith using either a first network net operating in a first mode or a second network net operating in a second mode different from the first mode;

a memory suitable to store and maintain said first network net, a first operating system, a second operating system and a second network net;

means operably connected to said memory and network adapter for loading said first operating system and network net into said memory of the client workstation;

a microprocessor suitably programmed for saving the state of the client workstation before said first network net is enabled and thereafter using the first network net to transmit a request to the network server for files associated with said second operating system and said second network net, wherein said microprocessor is further programmed to load said second operating system and said second network net into the memory of the client workstation when the first operating system and first network net are in the memory, restore the state of the client workstation after the network adapter receives said files associated with the second operating system and second network net, and enable the second operating system and second network net.

11. In a computer network system having at least one client workstation connected to a network server, a method of transitioning a client workstation from a first network net operating in a real mode to a second network net operating in a protected mode, comprising the steps of:

loading a first operating system operating in the real mode into a memory of the client workstation;

saving the state of the client workstation and thereafter enabling the first network net which operates in the real mode;

connecting the client workstation to the network server for communication therewith using the first network net;

transmitting by the client workstation using the first network net a request to the network server for files associated with a second operating system and second network net which operate in the protected mode;

receiving at the client workstation using the first network net files associated with the second operating system and second network net and loading the second operating system and second network net into the memory of the client workstation when the first operating system and first network net remain in the memory of the client workstation;

restoring the state of the client workstation and disabling the first network net;

passing network system state information from the first network net to the second network net; and enabling the second network net.

* * * * *